US008731901B2

(12) United States Patent
Srihari et al.

(10) Patent No.: US 8,731,901 B2
(45) Date of Patent: May 20, 2014

(54) CONTEXT AWARE BACK-TRANSLITERATION AND TRANSLATION OF NAMES AND COMMON PHRASES USING WEB RESOURCES

(75) Inventors: Rohini K. Srihari, Williamsville, NY (US); Richard Smith, Grand Island, NY (US); Erik Petersen, Amherst, NY (US)

(73) Assignee: Content Savvy, Inc., Amherst, NY (US)

( * ) Notice: Subject to any disclaimer, the term of this patent is extended or adjusted under 35 U.S.C. 154(b) by 235 days.

(21) Appl. No.: 12/959,309

(22) Filed: Dec. 2, 2010

(65) Prior Publication Data

US 2011/0137636 A1    Jun. 9, 2011

Related U.S. Application Data

(60) Provisional application No. 61/266,042, filed on Dec. 2, 2009.

(51) Int. Cl.
*G06F 17/28* (2006.01)
(52) U.S. Cl.
USPC ................................ 704/2; 704/277
(58) Field of Classification Search
USPC .......................................................... 704/2
See application file for complete search history.

(56) References Cited

U.S. PATENT DOCUMENTS

| 5,784,069 A | 7/1998 | Daniels et al. |
| 5,793,381 A | 8/1998 | Edberg et al. |
| 5,819,265 A | 10/1998 | Ravin et al. |
| 6,081,803 A | 6/2000 | Ashby et al. |
| 7,136,805 B2 | 11/2006 | Wang |
| 7,212,963 B2 | 5/2007 | Li |
| 7,599,921 B2 | 10/2009 | Biesenbach et al. |
| 7,865,358 B2 * | 1/2011 | Green et al. ................ 704/10 |
| 7,983,903 B2 * | 7/2011 | Gao ............................. 704/10 |
| 8,275,604 B2 * | 9/2012 | Jiang et al. ..................... 704/4 |
| 2005/0119875 A1 | 6/2005 | Shaefer, Jr. et al. |
| 2010/0023318 A1 | 1/2010 | Lemoine |
| 2010/0211377 A1 | 8/2010 | Aoyama et al. |

OTHER PUBLICATIONS

Bagga, et al., "Entity-Based Cross-Document Coreferencing Using the Vector Space Model," Proceedings of the 17th International Conference on Computational Linguistics, Aug. 10-14, 1998, Montreal, Quebec, Canada.

Carpuat et al., "Toward Integrating Word Sense and Entity Disambiguation into Statistical Machine Translation," In Third International Workshop on Spoken Language Translation (IWSLT 2006) Kyoto, Nov. 2006.

Day, et al., "A Corpus for Cross-Document Co-Reference," International Conference on Language Resources and Evaluation (LREC) 2008, 2996-2999.

(Continued)

*Primary Examiner* — Susan McFadden
(74) *Attorney, Agent, or Firm* — Charles Schemwell

(57) ABSTRACT

Described within are systems and methods for transliterating and translating source non-Romanized language text strings from a plurality of electronic sources to Romanized target language text strings by converting the source non-Romanized language text strings to a standard document encoding format, splitting the source non-Romanized language text strings into smaller units, transforming the smaller units into entity profiles, processing the entities profiles with data from external databases, translating the entities in the entity profiles into a Romanized target language, and outputting the entities into a plurality of data formats for external systems.

19 Claims, 12 Drawing Sheets

(56) References Cited

OTHER PUBLICATIONS

Janya, Solution Brief: Unstructured Text Extraction and Visualization, [online], [retrieved on Nov. 11, 2010]. Retrieved from Internet <URL:http://janyainc.net/pdf/solution%20ofBief%20-%20Semmantex%20Webtas.pdf>.

Shia, et al., "A Web-Based Unsupervised Algorithm for Learning Transliteration Model to Improve Translation of Low-Frequency Proper Names," National Language Processing and Knowledge Engineering—Proceedings of 2005 IEEE International Conference on, 420-425, 2005.

Srihari, et al., "InfoXtract: A Customizable Intermediate Level Information Extraction Engine," Journal of Natural Language Engineering 12:4.

Srihari, et al., "Sentiment Analysis of Fictional Characters Based on Entity Profiles," In Proc. Digital Humanities '09 Conference Abstracts, Jun. 2009, Univ. of MD MITH, 263-265.

Srinivasan, et al., Proceedings of the Text Analysis Conference (TAC) Workshop, Gaithersburg, Maryland, 2009 "Cross Document Person Name Disambiguation Using Entity Profiles."

Wentland, et al., "Building a Multilingual Lexical Resource for Named Entity Disambiguation, Translation and Transliteration," In Proc. of LREC '08, 2008, 3230-3237.

* cited by examiner

| Processing | Precision | Recall | F-score |
|---|---|---|---|
| Lexicon only | 55.81 | 11.71 | 19.35 |
| Lex + Translit | 40.00 | 14.63 | 21.43 |
| Lex + CJKV | 61.36 | 39.51 | 48.07 |
| Lex+CJKV+Translit | 55.48 | 41.95 | 47.78 |

FIG. 4

| Entity Type | Precision | Recall | F-score |
|---|---|---|---|
| GPE | 83.21 | 64.04 | 72.38 |
| Organization | 21.79 | 9.83 | 13.55 |
| Person | 55.48 | 41.95 | 47.78 |
| Facility | 75.00 | 18.75 | 30.00 |
| Location | 0.00 | 0.00 | 0.00 |
| Overall | 58.51 | 37.48 | 45.69 |

FIG. 5

```
<NeGPE english="Slovenia">斯洛文尼亚
</NeGPE>
 总理 <NePer english="Jansa">扬沙
</NePer> ,
<NeOrg english="European Commission">
欧洲 委员会</NeOrg>
主席 <NePer english="Barroso">巴罗佐
</NePer> 和
<NeGPE english="European Union">欧盟
</NeGPE>
外交 政策 负责人 <NePer
english="Solana">索拉纳</NePer>
 与 <NePer english="Medvedev">梅德韦杰
夫</NePer> 共 进 非正式 晚餐
```

Slovenia premier the sand blowing, Council of Europe President Baluozuo and European Union foreign policy person in charge Solana and Medvedev have unofficial supper.

702

Slovenian President Jansa, European Commission president Barroso and EU foreign policy chief Solana had an informal dinner with Medvedev.

| Chinese Transliterated Name | English Name |
|---|---|
| 801 — 福德 | Foord, Forde, Ford |
| 802 — 福特 | |
| 803 — 迪士尼 | Disney |
| 804 — 迪斯尼 | |
| 805 — 迪斯奈 | |
| 806 — 狄斯奈 | |
| 807 — 狄士尼 | |
| 808 — 海珊 | Hussein |
| 809 — 哈珊 | |
| 810 — 侯塞因 | |

FIG. 8

Chinese text snippet:
北约的一名德国将军说，稳定阿富汗局势需要增派多达6千人的部队。拉姆斯将军对德国公共广播电台说，目前兵力不足可能导致将来北约领导的国际安全和援助部队推迟撤出阿富汗。拉姆斯表示，要维持对阿富汗部分地区的控制，急需增派5千到6千人的部队。

901

Human translation:
A NATO German general said that stabilizing the situation in Afghanistan requires sending up to six thousand additional troops. General Ramms said on German public radio that the insufficient current troop strength could lead NATO leaders to postpone the withdrawal of the International Security and Assistance Force from Afghanistan. Ramms said that to maintain control of parts of Afghanistan, sending five to six thousand additional troops is urgently needed.

902

Google's original translation:
NATO, a German general said that the stability of the situation in Afghanistan need up to 6,000 additional troops. Secretary General of the German public radio said that the current strength may lead to lack of future NATO-led International Security and Assistance Force in Afghanistan to postpone the withdrawal. Rumsfeld said that to maintain the control of parts of Afghanistan, the much-needed additional 5 1000-6 1,000 troops.

903

Replacing the Chinese with the actual English:
NATO, a German general said that the stability of the situation in Afghanistan need up to 6,000 additional troops. General Ramms the German public radio said that the current strength may lead to lack of future NATO-led International Security and Assistance Force in Afghanistan to postpone the withdrawal. Ramms that it is necessary to maintain control of parts of Afghanistan, the much-needed additional 5 1000-6 1,000 troops.

904

Replacing the Chinese with the pinyin transliteration:
NATO, a German general said that the stability of the situation in Afghanistan need up to 6,000 additional troops. Lamusi General of the German public radio said that the current strength may lead to lack of future NATO-led International Security and Assistance Force in Afghanistan to postpone the withdrawal. Lamusi that it is necessary to maintain control of parts of Afghanistan, the much-needed additional 5 1000-6 1,000 troops.

905

Substituted with more common name:
General Powell on German public radio said that the current strength may lead to lack of future NATO-led International Security and Assistance Force in Afghanistan to postpone the withdrawal. Powell said that, in order to maintain the control of parts of Afghanistan, the much-needed additional 5 1000-6 1,000 troops.

| Arabic Entity | English Translation/ Transliteration |
|---|---|
| اوستيرغارد | Ostergaard |
| مادفورد | Medford |
| ثومبسون | Thompson |
| ابراهيم | Abraham |
| دوتش | Dutch |
| خرالدين | Geraldine |
| سوكارنو | Sukarno |

FIG. 10

Document Viewer: ( Jihad Jane ) امريكية شقراء تعلن الجهاد

«جين الجهادية» (JIHAD JANE). . . هذا هو اللقب الذي اختارته الشقراء الأميركية ذات العينين الخضراوين كولين لاروز (46 عاماً)، بعدما أظهرت رغبة مفزعة في رسائل إلكترونية ومقاطع فيديو على موقع «يوتيوب» في القتل أو ال Colleen LaRose محاولتها قتل «الكفار». وكانت هيئة محلفين كبرى وجهت اتهامات (الثلاثاء) إلى «جين الجهادية» - وهي من بنسلفانيا - بالمساعده في تجنيد شبكة لتنفيذ هجمات انتحارية وضربات إرهابية أخرى في أوروبا وآسيا.

CONTEXT AWARE BACK-TRANSLITERATION AND TRANSLATION OF NAMES AND COMMON PHRASES USING WEB RESOURCES

PRIORITY CLAIM

This application claims priority to U.S. Provisional Patent Application No. 61/266,042, filed Dec. 2, 2009, the content of which is incorporated herein by reference in its entirety.

CROSS REFERENCE TO RELATED APPLICATIONS

This application is related to copending U.S. patent application Ser. No. 12/917,384, filed Nov. 1, 2010. The disclosure of said copending application is incorporated herein by reference.

FIELD OF THE INVENTION

The systems and methods for the Context Aware Back-transliteration and Translation of Names and Common Phrases Using Web Resources relates to machine translations. More specifically, various embodiments relate to improving the accuracy of machine translations from a source language to a target language using named entity profiles.

BACKGROUND OF THE INVENTION

Natural language processing (NLP) systems are computer implemented software systems that intelligently derive meaning and context from natural language text. "Natural languages" are languages that are spoken by humans (e.g., English, French and Japanese). Computers cannot, without assistance, distinguish linguistic characteristics of natural language text. Natural language processing systems are employed in a wide range of products, including Information Extraction (IE) engines, spelling checkers, grammar checkers, machine translation systems, and speech synthesis programs.

Often, natural languages contain ambiguities that are difficult to resolve using computer automated techniques. Word disambiguation may be necessary because many words in any natural language have more than one sense. For example, the English noun "sentence" has one or more senses in common usage: one relating to grammar, where a sentence is a part of a text or speech, and one relating to punishment, where a sentence is a punishment imposed for a crime. Human beings use the context in which the word appears and their general knowledge of the world to determine which sense is meant.

Named entity recognition (NER) focuses on the proper detection and classification of proper noun sequences into semantic categories, such as person name, organization name and/or location name. NER may be the first major step in the more comprehensive task of IE.

For example, a cross-lingual retrieval of Chinese scientific documents using English as the query language may necessitate the use of NER. Other keyword retrieval systems may not be sufficient to handle queries of these types. Users may be interested in queries such as, finding people associated with alternative fuel for aerospace applications and retrieving a list of people and/or relevant publications that may match this query. Keyword querying, while very efficient for document retrieval, may not be sufficient to respond to such queries. It may be necessary to index the documents, identify key topics, and identify named entities. Thus, a response to such a query may first filter documents based on topic match, and subsequently return people names as results. Metadata associated with scientific documents may help in certain types of queries, but often the names of interest may be in the body of the document. Thus NER may be required. Although such queries may not require machine translation, although the results may require transliteration/translation back to English for readability.

In another Example, where Chinese documents may be translated by a machine translation system into English to facilitate searching and browsing, the user may often obtain poor search results due to name translation errors. Although native Chinese names may be translated fairly well, non-Chinese origin names may tend to be translated poorly. In addition to original English names, the latter category may include Japanese, Korean, and Vietnamese names along with non-Han Chinese names, such as Tibetan and Mongolian. Translation of non-Chinese names may include both a transliteration and translation component; the latter may be seen when a name includes a common noun such as Mount Everest.

Using native Chinese tagging and categorizing of named entities prior to machine translation may improve the quality of subsequent name translation, and even overall translation results. Current machine translation systems may be evaluated by methodology that computes a score based on similarity of automatic translations to a gold standard. Unfortunately, other metrics may not provide much weight to name translation as it may be possible to do well on other evaluations with relatively poor translation. On the other hand, when using machine translated text in retrieval, the incorrect translation of names may cause poor search results.

Various query templates have been developed which call for exact snippets of text to be returned in response to the specific query. Performing this task may require sophisticated IE techniques, which may extract and organize information such that specific responses (rather than returning relevant documents) may be generated in response to the query.

For example, one or more snippets may be returned as the result of such the query below.

Query: WHERE HAS [Tariq Aziz] BEEN AND WHEN?
Snippet: Iraq's Deputy Prime Minister Tariq Aziz begins a four-day visit to Italy and the Vatican with Pope John Paul II.

Others have shown that entity tagging can improve the quality of machine translation. Without considering context, entities may be translated as regular common nouns. For example, in Chinese, most of the characters used in person names are also used elsewhere in the language. To accurately translate a name it must first be identified as a name and then the means of translation depends on what kind of name it is, such as Chinese, Japanese, Korean, and/or English names In translation systems, a string of characters in one language may be converted into a string of characters in another language. One challenge to such translation systems may be that a word in one language may have multiple possible translations in the other language depending on the sense of the word. For example, in English, the word "plant" can either be translated to the Chinese word "gongchang" which corresponds to the sense of "factory" or to "zhiwu" which corresponds to the sense of "vegetation".

Therefore, a need exists for systems and methods to identify and categorize named or nominal entities in source language documents prior to or in lieu of a machine translation system translating the resulting snippets into a desired target language.

SUMMARY OF THE INVENTION

Embodiments of the Context Aware Back-transliteration and Translation of Names and Common Phrases Using Web Resources ("Context Aware Translation System") may include a named entity recognition and/or back-transliteration, transliteration or translation technique that extends, enhances and/or improves the accuracy of Machine translation systems translating entities from a source Non-Romanized language to a target Romanized language. Alternatively, embodiments of the Context Aware Translation System may also provide for increased accuracy in search results of a foreign document corpus with a query language other than that of the of the document corpus, such as a Romanized language query executed on a non-Romanized or Romanized and non-Romanized corpus. These search results may be from a faceted search or cross-lingual search. In addition to the pre-machine translation processing tasks discussed above, alternative embodiments of the Context Aware Translation System may perform post-machine translation processing tasks on the Non-Romanized entity to improve the accuracy of queries with a Romanized query language, such as a Romanized language query executed on a non-Romanized or Romanized and non-Romanized corpus.

Embodiments of the Context Aware Translation System include a system providing at least one analysis selected from the group comprising translating, transliterating and back-transliterating. The system comprising of at least the following: an information extraction engine structured and arranged to receive an input from at least one electronic source documents; a language detection module structured and arranged to classify the input based on an origin of the input; a vocabulary module structured and arranged to map the input to an electronic database derived from words based on the origin of the input; a transliteration module structured and arranged to produce multiple back-transliterated and translated forms for the input in a Romanized language and calculate confidence scores for the multiple back-transliterated and translated forms; and an output module to provide the multiple translated and back-transliterated forms and the confidence score in a format compatible with machine translation systems for the input.

Embodiments of the Context Aware Translation System include a computer based method providing at least one analysis selected from the group comprising translating, transliterating and back-transliterating. The method capable of performing at least the following steps of: receiving an input from at least one electronic document sources; classifying the input based on an origin of the input; splitting the input into at least one smaller unit with a tokenizer; converting the at least one smaller unit from a first encoding format into a second encoding format; transforming the at least one smaller unit in the second encoding formation in to at least one entity profile; processing the at least one entity profile with data from external databases; generating multiple back-transliteration and translation for each of the at least one entity profile; computing a confidence score for the multiple back-transliteration and translation; and outputting the multiple back-transliteration and translation and the confidence score into at least one format compatible with other external systems.

Additional features, advantages, and embodiments of the Context Aware Translation System are set forth or apparent from consideration of the following detailed description, drawings and claims. Moreover, it is to be understood that both the foregoing summary of the Context Aware Translation System and the following detailed description are exemplary and intended to provide further explanation without limiting the scope of the Context Aware Translation System as claimed.

BRIEF DESCRIPTION OF THE DRAWINGS

The accompanying drawings, which are included to provide a further understanding of the Context Aware Translation System and are incorporated in and constitute a part of this specification, illustrate preferred embodiments of the Context Aware Translation System and together with the detailed description serve to explain the principles of the Context Aware Translation System. In the drawings:

FIG. 4 is an illustrative example of person translation results according to one embodiment of a Context Aware Translation System;

FIG. 5 is an illustrative example of an overall entity translation results according to one embodiment of a Context Aware Translation System;

FIG. 6 is an illustrative example of an output according to one embodiment of a Context Aware Translation System;

FIG. 7 is an illustrative example of a non-Romanized translation according to one embodiment of a Context Aware Translation System;

FIG. 8 is an illustrative example of Chinese entities mapping to equivalent English entities;

FIG. 9 is an illustrative example of Chinese entities translated, transliterated or back-transliterated to English according to one embodiment of a Context Aware Translation System;

FIG. 10 is an illustrative example of Arabic entities translated, transliterated or back-transliterated into English according to one embodiment of a Context Aware Translation System;

Figure 12:
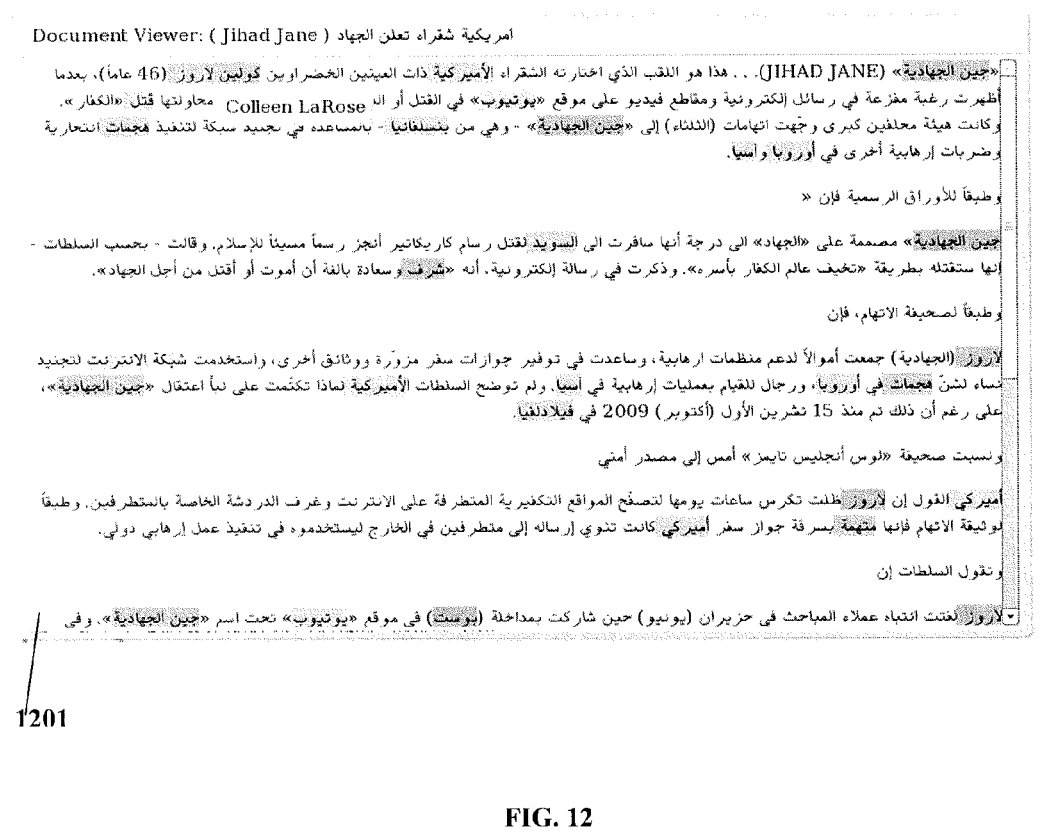

FIG. 12 is an illustrative example of a search result from a Romanized query interface for searching a triaging a non-Romanized document corpus according to one embodiment of a Context Aware Translation System.

DETAILED DESCRIPTION OF THE INVENTION

Figure 1:
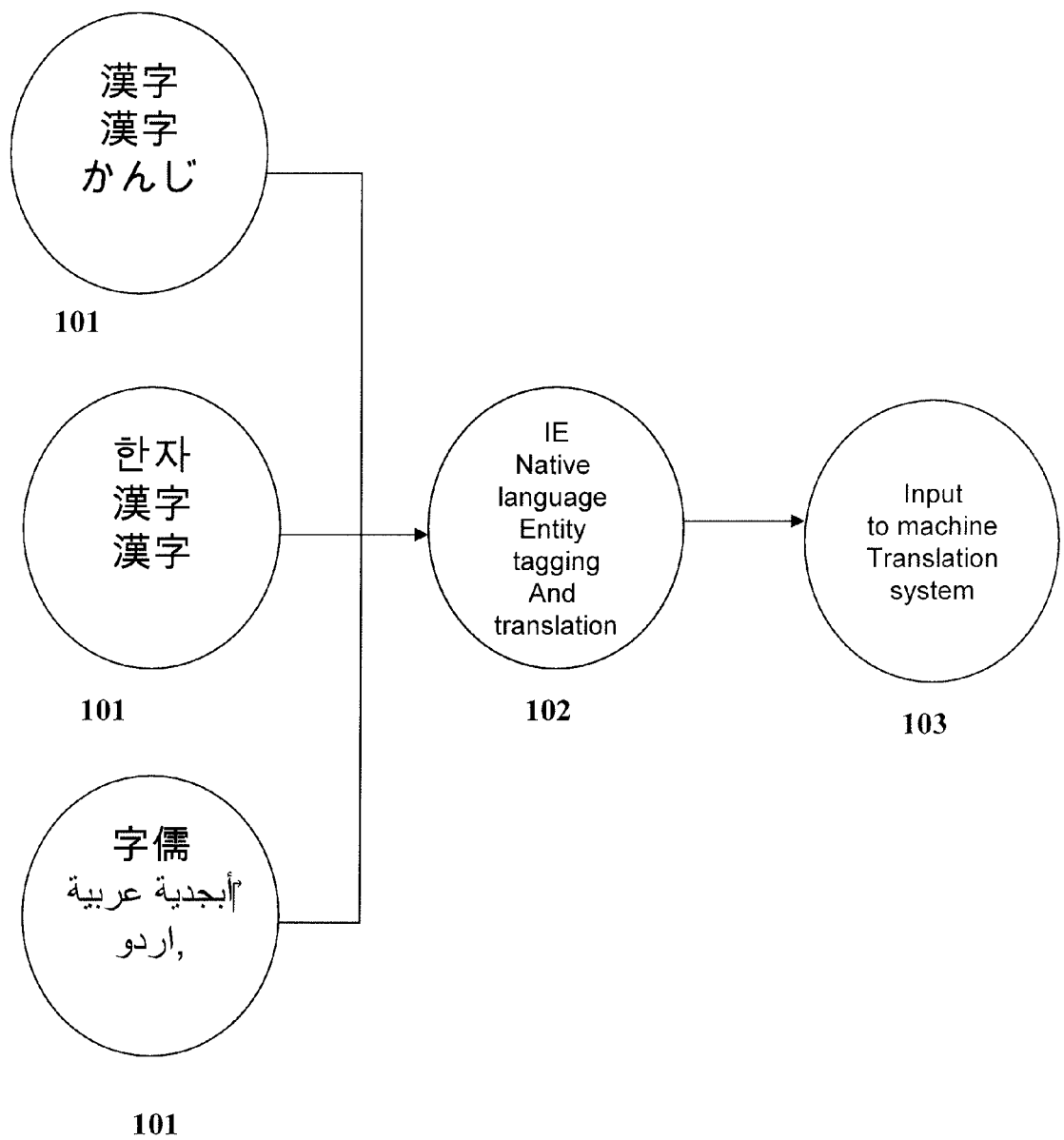
FIG. 1 is a flowchart illustrating a series of operations used for entity extraction and back-transliteration, transliteration or translation of entities and outputting the results to a machine translation system according to one embodiment of a Context Aware Translation System.

In the following detailed description of the illustrative embodiments, reference is made to the accompanying drawings that form a part hereof. These embodiments are described in sufficient detail to enable those skilled in the art to practice a Context Aware Translation System and related systems and methods, and it is understood that other embodiments may be utilized and that logical structural, mechanical, and electrical changes may be made without departing from the spirit or scope of this disclosure. To avoid detail not necessary to enable those skilled in the art to practice the embodiments described herein, the description may omit certain information known to those skilled in the art.

As will be appreciated by one of skill in the art, aspects of a Context Aware Translation System and related systems and methods may be embodied as a method, data processing system, or computer program product. Accordingly, aspects of a Context Aware Translation System and related systems and methods may take the form of an entirely hardware embodiment or an embodiment combining software and hardware aspects, all generally referred to herein as an information extraction engine. Furthermore, elements of a Context Aware Translation System and related systems and methods may take the form of a computer program product on a computer-usable storage medium having computer-usable program code embodied in the medium. Any suitable computer readable medium may be utilized, including hard disks, CD-ROMs, optical storage devices, flash RAM, transmission media such as those supporting the Internet or an intranet, or magnetic storage devices.

Computer program code for carrying out operations of a Context Aware Translation System and related systems and methods may be written in an object oriented programming language such as Java®, Smalltalk or C++ or others. Computer program for code carrying out operations of a Context Aware Translation System and related systems and methods may be written in conventional procedural programming languages, such as the "C" programming language or other programming languages. The program code may execute entirely on the server, partly on the server, as a stand-alone software package, partly on the server and partly on a remote computer, or entirely on the remote computer. In the latter scenario, the remote computer may be connected to the user's computer through a local area network (LAN) or a wide area network (WAN), or the connection may be made to an external computer (for example, through the Internet using an Internet Service Provider) using any network or internet protocol, including but not limited to TCP/IP, HTTP, HTTPS, SOAP.

Aspects of a Context Aware Translation System and related systems and methods are described with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, server, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer, server or other programmable data processing apparatus to cause a series of operational steps to be performed on the computer or other programmable apparatus to produce a computer implemented process such that the instructions that execute on the computer or other programmable apparatus, provide steps for implementing the functions/acts specified in the flowchart and/or block diagram block or blocks, and may operate alone or in conjunction with additional hardware apparatus described herein.

DEFINITIONS

As used herein, a database can be a relational database, flat file database, relational database management system, object database management system, operational database, data warehouse, hyper media database, post-relational database, hybrid database models, RDF databases, key value database, XML database, XML store, a text file, a flat file or other type of database.

As used herein, non-Romanized languages include, for example, Arabic, Armenian, Belarusian, Bengali, Bulgarian, Chinese, Croatian, Czech, Devanagari, Divehi, Farsi, Georgian, Greek, Gujarati, Hebrew, Hindi, Japanese, Kannada, Kazakh, Korean, Kyrgyz, Latvian, Lithuanian, Macedonian, Malayalam, Marathi, Mongolian, Pashtun, Punjabi, Romanian, Russian, Serbian, Syriac, Tamil, Telugu, That, Turkish, Ukrainian, Urdu, Uzbek, Vietnamese and other non-Romanized languages.

As used herein, machine translation systems include Asia Online, Hindi to Punjabi Machine Translation System, Worldlingo, SDL ETS, Language Weaver, SYSTRAN, Babel Fish, Promt, Voila.fr, Orange.fr, AppTek, IdiomaX, Toggletext, Anusaaraka, Apertium, Google Translator, MOSES and other machine translation tools.

An accurate translation of named or nominal entities can be important to the correct understanding and translation of a document. Named entities, however, are often out-of-vocabulary and can be difficult to translate. Machine translation (i.e., automatic translation from one language to another) software frequently fails to correctly translate proper names.

Transliteration is a process wherein an input string in its native orthographic form is converted to a string in another language, usually based on the phonetics of the original input. Transliteration is frequently used in machine translation systems, to create possible equivalents of unknown entities, cross-lingual information retrieval systems and in development of multilingual resources.

Transliteration is usually classified into two directions. Given a pair (s, t) where s is the original named or nominal entity in the source language and t is the transliterated named or nominal entity in the target language, forward transliteration hereinafter, referred to as transliteration is the process of phonetically converting s into t, and backward transliteration, hereinafter referred to as back-translation is the process of correctly generating s given t. Back-transliteration is more challenging than transliteration. While transliteration can accomplish the mapping through table-lookup, back-transliteration is required to disambiguate the noise produced in the transliteration and estimate the original named or nominal entity as close as possible.

Embodiments of the Context Aware Translation System described in detail below can provide language-aware and context-aware recognition and translation of named entities to significantly improve machine translation systems.

Now referring to the drawings, and more particularly to FIG. 1, there is shown a series of operations used for entity extraction and back-transliteration, transliteration or translation of entities 307 and optionally outputting the results to a machine translation system according to one embodiment of a Context Aware Translation System. At step 101, source electronic documents 303 containing one or more non-Romanized language entities 307 are input into computer program 301 according to various embodiments of the Context Aware Translation System. In step 102, the computer program 301 extracts entities 307 from the source electronic documents 303 from step 101, detects and pre-tags the entities 307, and generates an entity profile 302 according to various embodiments of the Context Aware Translation System. Finally, optional step 103 is described in further detail below.

Figure 2:
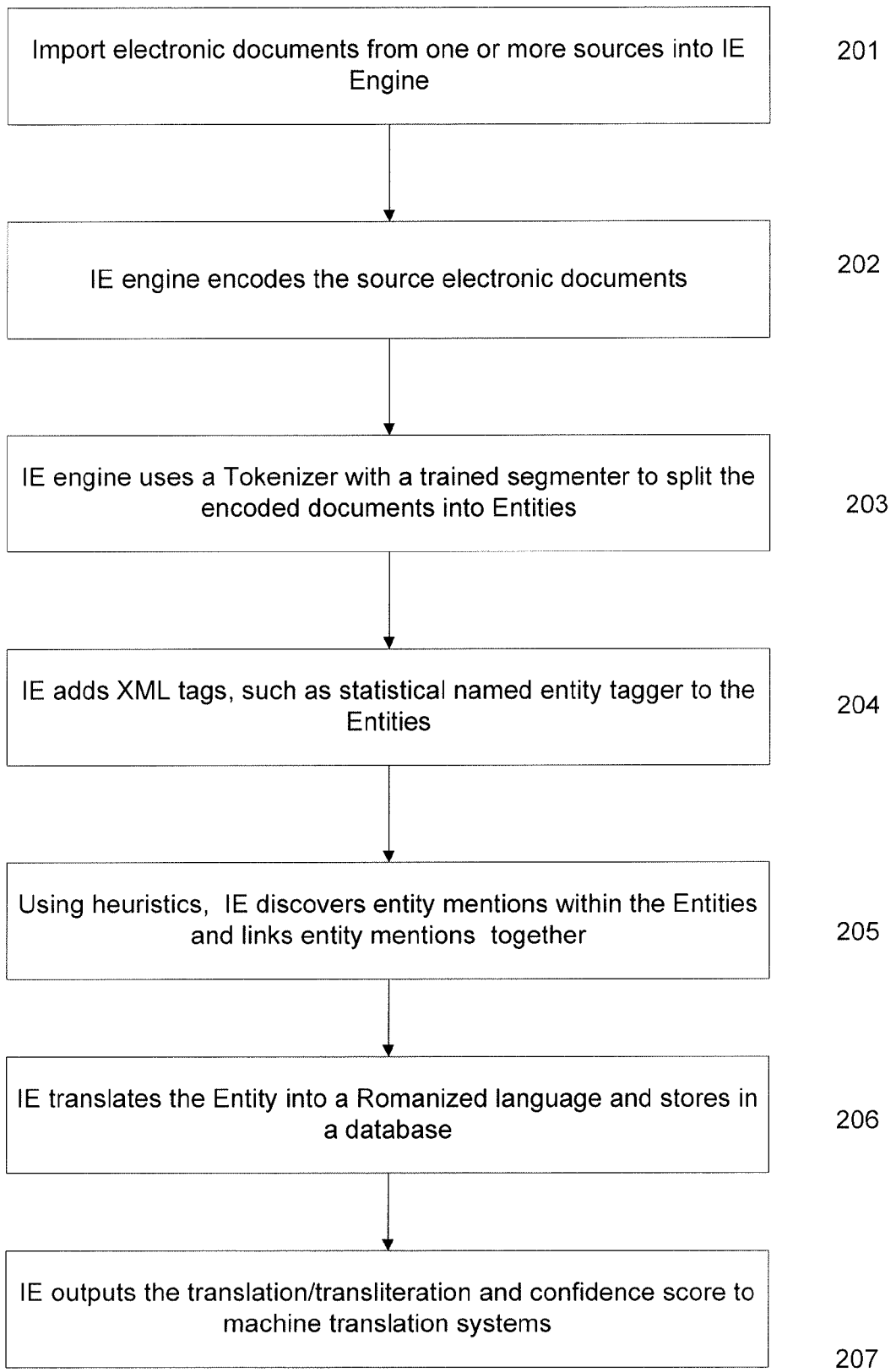
FIG. 2 is a flowchart illustrating a series of operations used for entity extraction and back-transliteration, transliteration or translation of entities according to one embodiment of a Context Aware; Translation System.

In another alternative, step 102 is described in further detail below in reference to FIG. 2. FIG. 2 illustrates a series of operations used for entity extraction and translation, back-transliteration and transliteration of entities according to one embodiment of a Context Aware Translation System. At step 201, electronic source documents 303 containing non-Romanized entities are received from one or more data sources. In step 202, the computer program 301 may encode the source documents 303 in step 201 from encodings such as ASCII, Latin 1, Guobiao (GB), Big-5 or Big5 and/or Hanzi (HZ) encoding into a standard document 303 encoding format, such as Unicode, ASCII and the like.

In step 203, the computer program 301 may use a tokenizer 305 to split the source documents 303 from step 202 into smaller units, such as words, sentences, paragraphs, pages, punctuation and the like. For non-Romanized languages that do not mark word boundaries in text, spaces may not be used for tokenization. The non-Romanized language tokenizer 305 may call a segmenter which uses a non-Romanized lexicon 313, some pattern matching rules, and the maximal matching algorithm to find identify tokens such as words, numbers, punctuation, etc. These are then converted in a token list 320 for later processing by the computer program 301. To guard against potential matching problems caused by changes in the non-Romanized tokenizer 305, the entries in the computer program 301 lexicons 313 start unsegmented and may be tokenized with the non-Romanized tokenizer 305 when compiled to be used by the Context Aware Translation System. In some alternatives, no particular segmentation style may be assumed by the lexicons 313. In some alternatives, additional segmentation strategies may be used to improve accuracy.

In some alternatives, for transliteration or back transliteration, matching may include the use of a transliteration algorithm. For translation, matching may include the use of transliteration algorithm, information from web databases such as, such as DBPEDIA, WIKIPEDIA, GOOGLE News and/or other internet databases, and various statistical techniques.

In step 204, the computer program 301 may generate an Entity Profile 302 and use a named entity 307 tagger to add features to the Entity Profile 302 by adding XML tags to add Non-Romanized language features to the Entity Profile 302. In one alternative, the entity profile 302 is a summary of the entity 307 that combines in one place features of the entity 307, attributes of the entity 307, relations to or from another entity 307, and events that the entity 307 is involved in as a participant. For example, the entity profile 302 may contain an organization profile, person profile and a location profile. The computer program 301 may generate an entity profile 302, by receiving structured or unstructured data from one or more electronic documents in multiple languages as input, from multiple sources. The electronic documents are processed by the computer program 301 to recognize named entity and nominal entity mentions using maximum entropy markov models ("MaxEnt"). The computer program 301 may then transform the processed data into structured data by using techniques, such as tagging salient or key information from the entity 307 with Extensible Markup Language (XML) tags. The computer program 301 may perform a coreference resolution on the nominal entity mentions as well as any pronouns in the document according to a pair-wise entity coreference resolution module. The computer program 301 may output 601 the entity profile 302 structured data into any one of multiple data formats or optionally store the entity profile 302 in a database.

In some alternatives, back-transliteration or transliteration may involve evaluating the frequency of an Entity 307 in a Non-Romanized document 303 and comparing that frequency to an evaluation of the frequency of the same Entity 307 in a Romanized document. This technique may provide significant advantages over other systems that may rely on aligned corpora comparison of sentences in the Non-Romanized document 303 and corresponding translations of the same sentence by machine translation systems in a Romanized document 303.

Once the above preprocessing steps are completed, a conditional random field (CRF)-based statistical named entity tagger may be applied. The entity tagger may be comprised of one or more different and complementary paradigms in order to accurately tag entities, such as: (i) lexical look-up 313, (ii) grammars 314, and/or (iii) machine-learning approach. In the first, lists of instances corresponding to various entity 307 types, such as person name, organization name, chemical names, and biomedical names may be being culled through various sources. This includes widely available lexical resources 313, such as the Linguistic Data Consortium and as well as internet resources, such as DBPEDIA, WIKIPEDIA, GOOGLE News and/or other internet databases. The grammar 314 approach may involve using the grammar 314 toolkit that may be part of the computer program 301 in order to develop sets of specific rules in order to correctly identify and classify certain entity 307 types. This may be especially useful for handling entity 307 types that have a fairly consistent pattern (e.g. time and date expressions) as well as to handle exceptions which may not be handled by the one or more paradigms. The entity tagger may be based on a supervised learning model combining maximum entropy and Hidden Markov Models. The Context Aware Translation System may use the Viterbi algorithm to decode the best tag sequence for a given sentence. In some alternatives, segmentation may be treated as a sequence tagging problem, with the tags marking the start of words.

In step 205, the computer program 301 may classify the documents 303 from step 204 using a classification database, such as DBPEDIA, WIKIPEDIA, GOOGLE News and/or other internet databases, Lexicons, Dictionaries and/or native language library classification databases. Using heuristics during the classing, the computer program 301 may optionally, discover entity mentions within the entity profiles and link entity mentions together. In some alternatives, an entity may be classified based on its origin by using a classifier, such as a Bayesian classifier based on the n-gram (n can be 1 or more) substrings in the named or nominal entities 307. In some alternatives, the n-gram may be the characters or letters in the entity 307. In some alternatives, n-gram may be unigrams, bigrams or trigrams. In some alternatives, the probability of words 1 . . . N in the n-gram model for bigrams and trigrams may be represented by the following: $p(w_1^N) = \Pi p(w_i/w_{i-1})$ or $p(w_i^N) = \Pi p(w_i/w_{i-1}, w_{i-2})$. In some alternatives, n-gram models may be improved by setting the probability mass of n-grams with frequency greater than a threshold is redistributed across all the n-grams; predict cluster of similar words instead of single word; caching, as recently observed words are likely to occur again (this may be combined with other models); skipping words not directly adjacent to target word, which may not contain useful information; and modeling different kinds of sentences separately.

In some alternatives, the performance of the Context Aware Translation System may be improved by incorporating statistical information at the word sequence level. The performance improvement may derive from selection of lower-rank words from the Context Aware Translation System output 601 when the surrounding context indicates such selection makes the entire sentence more probable. For example, given a set of output words $\overline{X}$ which emanate from a noisy channel, such as the Context Aware Translation System, N-gram word models seek to determine the string of words $\overline{W}$ which most probably gave rise to it. This amounts to finding the string $\overline{W}$ for which the a posteriori probability $$P(\overline{W} \mid \overline{X}) = \frac{P(\overline{W}) * P(\overline{X} \mid \overline{W})}{P(\overline{X})}$$

is maximum, where $P(\overline{X}|\overline{W})$ is the probability of observing $\overline{X}$ when $\overline{W}$ is the true word sequence, $P(\overline{W})$ is the a priori probability of $\overline{W}$ and $P(\overline{X})$ is the probability of string $\overline{X}$. The values for each of the $P(\overline{X}_1|\overline{W}_1)$ is known as the channel (or confusion) probabilities and can be estimated empirically. If we assume that words are generated by an nth order Markov source, then the a priori probability $P(\overline{W})$ can be estimated as $P(\overline{W})=P(W_{m+1}|W_{m+1-n}) \ldots P(W_1|W_0)*P(W_0)$ where $P(W_n|W_{k-n} \ldots W_{k-1})$ is called the nth-order transitional probability. The Viterbi algorithm is a dynamic method of finding optimal solutions to the above quantity. As the number of words grow in the vocabulary, estimating the parameters reliably becomes difficult. For example, in a corpus with $6.799 \times 10^{10}$ 2-grams that could possibly occur in a 365,893, 263 word corpus (consisting of 260,740 unique words), approximately 14,494,217 actually occurred, and of these, 8,045,024 occurred only once.

In n-gram class models, words are mapped into syntactic classes. In this situation, $p(w_i|w_{i-1})$ becomes $P(w_t|w_{t-1})=p(w_t|C(w_t))p(C(w_t)|C(w_{t-1}))$ where $p(C(w_i)|C(w_{i-1}))$ is the probability to get to the class $C(w_i)$ following the class $C(w_{i-1})$ and $p(w_i|C(w_i))$ is the probability to get the word $w_t$ among the words of the class $C(w_i)$.

In some alternatives, the Context Aware Translation System may use n-gram class models where part-of-speech (POS) tags are used to classify words. For example, the Context Aware Translation System may use the notation A:B to indicate the case where word A has been assigned the tag B. For each sentence analyzed, the Context Aware Translation System may form a word: tag lattice representing all possible sentences for the set of word choices output by string matching. The problem is to find the best path(s) through this lattice. Computation of the best path requires the following information: (i) tag transition statistics, and (ii) word probabilities.

Transition probabilities describe the likelihood of a tag following some preceding (sequence of) tag(s). These statistics are calculated during training as:

$$P(\text{Word} \mid \text{Tag}) = \frac{\#(\text{Word: Tag})}{\#(\text{AnyWord: Tag})}$$

Beginning- and end-of-sentence markers are incorporated as tags themselves to obtain necessary sentence-level information. Word probabilities are defined (and calculated during training) as:

$$P(tag_B \mid tag_A) = \frac{\#(tag_A \to tag_B)}{\#(tag_A)}$$

The Viterbi algorithm may be used to find the best Word:Tag sequence through the lattice, i.e., the maximal value of the following quantity:

$$\prod_{i=1}^{n} P(Word_i \mid Tag_i) P(Tag_i \mid Tag_{i-1})$$

over all possible tag sequences $T=Tag_0, Tag_1 \ldots, Tag_{n+1}$ where $Tag_0$ and $Tag_{n+1}$ are the beginning-of-sentence and end-of-sentence tags respectively. The Viterbi algorithm may allow the best path to be selected without explicitly enumerating all possible tag sequences. A modification to this algorithm produces the best n sequences.

In step 206, the computer program 301 may translate, back-transliterate or transliterate the entities 307 into a Romanized language, such as English. In some alternatives, the computer program 301 generates a confidence score for the translation, back-transliteration or transliteration of the entities 307. For back-transliteration or transliteration, the computer program 301 combines or more factors, such as the likelihood that the letters in the source non-Romanized language are equivalent to the letters in the target Romanized language and the likelihood that the transliterated named or nominal entity is actually a named or nominal entity in the target language. By combining these two probabilities, the computer program 301 generates a confidence score for the transliteration or back-transliteration. For translations performed with a lexicon 313, the computer program 301 assigns a default confidence score of at least 0.8.

Finally, optional step 207 is described in further detail below.

IE Engine

Figure 3:
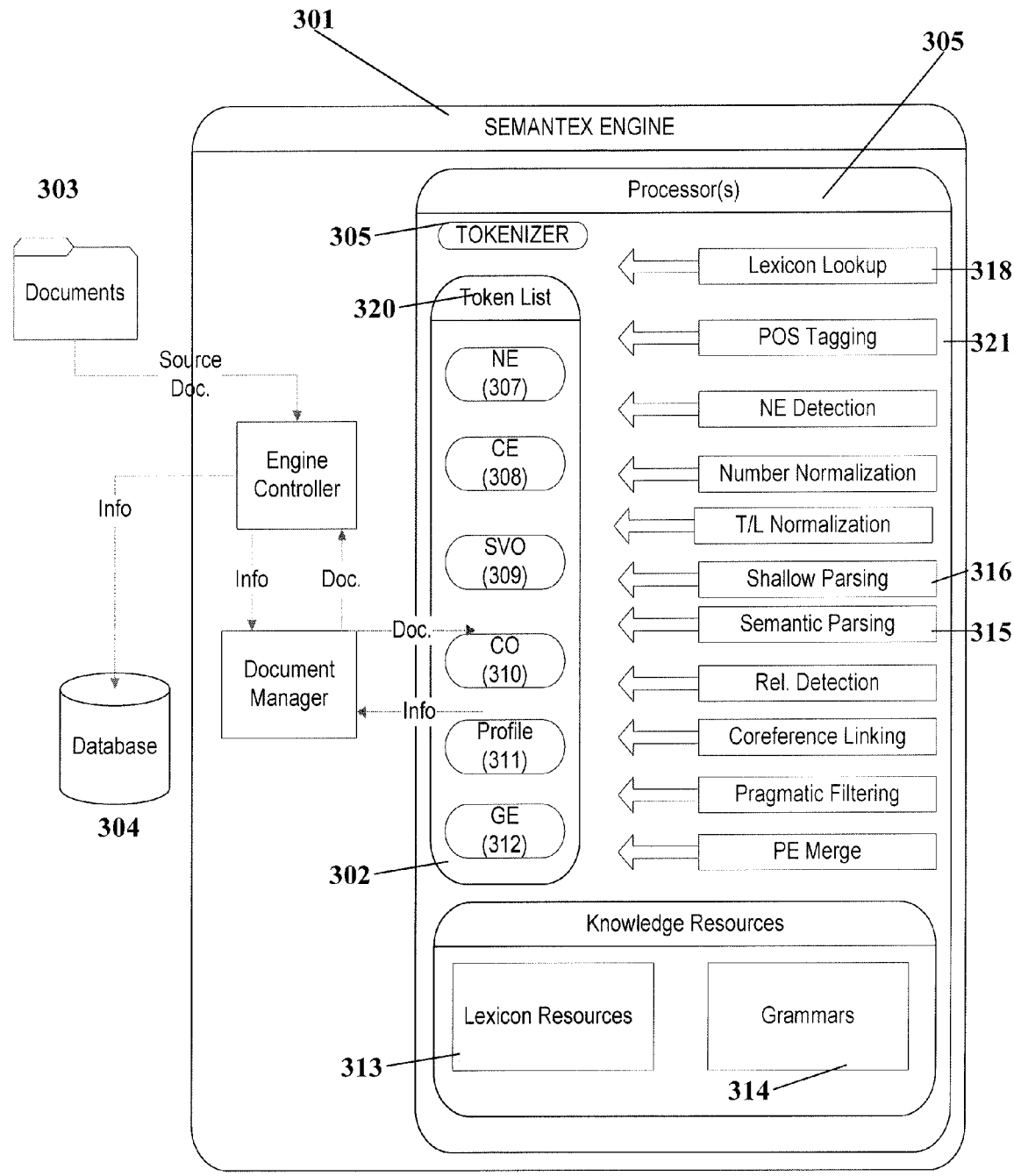
FIG. 3 is a schematic depiction of the internal architecture of an information extraction engine according to one embodiment of a Context Aware Translation System.

In one alternative, the processes of FIG. 2 are implemented by a platform or engine such as the IE engine computer program 301 depicted in FIG. 3. In FIG. 3 there is shown system architecture of an IE engine in accordance with one embodiment of a Context Aware Translation System.

In one embodiment, the computer program 301 may be a domain-independent, modular, scalable IE engine. The computer program 301 may reflect a hybrid approach to natural language processing, where lexical, grammatical and statistical approaches may be exploited at appropriate stages of the pipeline. Achieving the right balance of these paradigms was a major achievement for the computer program 301. IE tasks that primarily call for classification, such as named entity tagging, may benefit most from statistical approaches. IE modules that may attempt to decode inherent grammatical structure present in surface text may benefit most from grammar-based approaches. The grammar 314 formalism used by computer program 301 may be compiled into finite state transducers (FST). The computer program 301 may be a pipelined NLP system. Each level may utilize the results of the previous levels in order to achieve more sophisticated parsing. The Context Aware Translation System may have extended the FST paradigm to support various features necessary for practical NLP technology development. A key extension may be the use of token lists 206, as opposed to raw text for pattern matching operations within the FST. A token list 320 may be a hierarchical data structure representing the processed document 304 to the current stage in the cascade;

token lists 320 may facilitate multi-level processing and propagation of information. All the modules may update this common data structure and may be limited to one or more basic types of actions, including, for example, tagging, chunking and linking. Linguistic modules may range from basic preprocessing modules which handle file format variations etc., including one or more of the following: through lexicon look-up 318, entity tagging 321, shallow 317 and semantic parsing 316 and coreference 315. Customer specific grammars 314 may be applied towards the end of the cascade. The final output may be a set of entity profiles 302, consolidating one or more of the following: mentions, relationships and events associated with an entity, throughout a document.

The major categories of abstract information objects created by the default configuration of computer program 301 may be one or more of the following: (i) Named Entities (NE) 307; (ii) Correlated Entity (CE) 308 relationships: local relationships between entities; (iii) Entity Profiles 302: consolidation of all document-level information pertaining to a single entity (EP); (iv) General Events (GE) 312: representing who did what to whom and/or when and/or where; and (v) Pre-defined Events (PE): general events 312 that are semantically categorized, e.g. murder, steal, management change etc.

In some alternatives, the computer program 301 may be a modular, distributed application and may be capable of processing up to 15 MB per hour on a single processor. Because it supports multiple processor configurations, the computer program 301 may be highly scalable. The computer program 301 may support large (>1 million) document 303 collections. Requests to process documents 303 may be submitted through web services, or other mechanisms. The results of processing a document 303 may be returned as XML or stored directly in a database 304. Configuration files may enable the computer program 301 to be used with different resources, such as, for example, lexical 313, statistical and/or grammar resources 314, as well as subsets of the available IE modules.

In some alternatives, the computer program 301 may have been originally built to run on English and expect ASCII or Latin-1 encodings. To broaden the languages, the computer program 301 may have been adapted to use Unicode internally, such as with the IBM International Components for Unicode (ICU) library. The computer program 301 may load and convert incoming documents 303 to Unicode for processing even if the document uses an encoding of Unicode or a different Chinese encoding such as GB, Big-5 or Big5 and/or HZ.

In some alternatives, the computer program 301 processes electronic source documents 303 in Romanized or non-Romanized languages or encoding in a format, such as Unicode (UTF-8) or other encoding formats with changes to only the lexicons 313, grammars 314, language models, and with no changes to the computer program 301 platform. The computer program 301 may also process English text with foreign words that use special characters, such as the umlaut in German and accents in French.

In some alternatives, the computer program 301 processes information from several sources of unstructured or semi-structured data such as web sites, search engines, news feeds, blogs, transcribed audio, legacy text corpuses, surveys, database records, e-mails, translated text, Foreign Broadcast Information Service (FBIS), technical documents, transcribed audio, classified HUMan INTelligence (HUMINT) documents, United States Message Text Format (USMTF) XML records, and other data from commercial content providers such as FACTIVA and LEXIS-NEXIS.

In some alternatives, the computer program 301 outputs the entity profile 302 data in one or more formats, such as XML, application-specific formats, proprietary and open source database for use by Business Intelligence applications, or directly feed visualization tools such as WebTAS or VisuaLinks, and other analytics or reporting applications.

In some alternatives, the computer program 301 is integrated with other IE systems that provide entity profiles 302 with the characteristics of those generated by the computer program 301.

In some alternatives, the entity profiles 302 generated by the computer program 301 are used for semantic analysis, e-discovery, integrating military and intelligence agencies information, processing and integrating information for law enforcement, customer service and CRM applications, context aware search, enterprise content management and semantic analysis. For example, the entity profiles 302 may provide support or integrate with military or intelligence agency applications; may assist law enforcement professionals with exploiting voluminous information available by processing documents, such as crime reports, interaction logs, news reports among others that are generally know to those skilled in the art, and generate entity profiles 302, relationships and enable link analysis and visualization; may aid corporate and marketing decision making by integrating with a customer's existing Information Technology (IT) infrastructure setup to access context from external electronic sources, such as the web, bulletin boards, blogs and news feeds among others that are generally know to those skilled in the art; may provide a competitive edge through comprehensive entity profiling, spelling correction, link analysis, and sentiment analysis to professionals in fields, such as digital forensics, legal discovery, and life sciences research areas; may provide search application with context-awareness, thereby improving conventional search results with entity profiling, multilingual extraction, and augmentation of machine translation; and may provide control over an enterprise's data sources, thereby powering content management, and extending data utilization beyond the traditional structured data In some alternatives, the computer program 301 processes individual source documents 303 one at a time. Alternatively, the computer program 301 processes multiple source documents 303 simultaneously.

In some alternatives, the computer program 301 treats different languages as different configurations. At any given time, the computer program 301 can support multiple configurations corresponding to multiple languages. In some alternatives, the computer program 301 may include a language detection module, which can route an electronic source document 303 through the appropriate configuration.

EXAMPLES

Example 1

In one example, the processes illustrated in FIG. 2, may be implemented by the computer program 301 for improving the translation, transliteration or back-transliteration of Chinese into a Romanized language such as English. In this example, the original Chinese sentence 701 can be roughly translated to the English sentence 703. Using machine translation systems to translate a Chinese sentence 701 results in the English sentence 702. Here, the machine translation system literally translates the characters in the name "Jansa" as "the sand blowing" instead of treating it as a name. The machine translation system finds the EC president as a name, but doesn't have a translation so it Romanizes it based on the pronunciation of the characters. Preprocessing with the Context Aware Translation System, however, improve the accuracy of the machine translation system. The Context Aware Translation System's output 601 for the Chinese sentence 701 may be substituted for the original Chinese sentence 701 and running it through a machine translation system returns the English sentence 703. This translation is more readable, finding all the names in the text and supplying accurate translations.

The first step in adapting the computer program 301 for this example may be tokenization, breaking the incoming text into smaller units such as, for example, words, sentences, paragraphs, pages, punctuation and the like. Because Chinese may not mark word boundaries in text, spaces may not be used for tokenization. Currently, the Chinese tokenizer 305 may call a segmenter which uses a Chinese lexicon 313, some pattern matching rules, and the maximal matching algorithm to find identify tokens such as words, numbers, punctuation, etc. These are then converted in a token list 320 for later processing by the computer program 301 More accurate segmentation strategies may be available. To guard against potential matching problems caused by changes in the Chinese tokenizer 305, the entries in the computer program 301 lexicons 313 start unsegmented and may be tokenized with the current Chinese tokenizer 305 when compiled to be used by the Context Aware Translation System. No particular segmentation style may be assumed by the lexicons 313.

In one alternative, the Context Aware Translation System may have the computer program 301 using the Chinese Treebank and a Maximum entropy-based sequence tagger to learn a segmenter model with a current accuracy score of 96.6, based on the SIGHAN segmentation score. This same corpus and Context Aware Translation System was used to learn a Chinese part of speech tagger 321 which may have a current accuracy of 91.5. Hand-crafted grammars 314 and automatically created lexicons 313 may be created to assign features of interest to individual tokens to use during named entity tagging. Some of these grammars may mark tokens that use characters commonly found in transliterated foreign names, that have the general structures of a Chinese name (Chinese surname followed by one or one or more Chinese characters), or that are Chinese numbers, dates or times. Lexicons 313 may include lists of transliterated names, Chinese surnames, job titles, places, organizations, vehicles, weapons and more. Many Chinese lexicon 313 entries include their English translation. Lexicons 313 may be derived from openly available resources, such as DBPEDIA, WIKIPEDIA, GOOGLE News and/or other internet databases, as well as being manually created and augmented.

While many features used by the computer program 301 for English may carry over to the Chinese system, such as organization triggers, surnames, and geographic affixes, other Chinese-specific features may be taken into account. Non-Chinese names may be transliterated into Chinese using a limited set of Chinese characters, so some alternatives include a feature marking a possible transliterated word. Other features may mark the possible origin of a name, either Chinese, Japanese, or "foreign". One alternative may have a feature added to mark words in the Latin alphabet appearing in Chinese texts. Because by default Chinese may not have spaces for word boundaries, any spacing that may be added could be significant and may be marked, something not relevant for English. It may be likely that each new language encountered would require additions and modifications to the feature set to adapt to the language's unique properties. Once the text may be tokenized and the feature set may have been adapted, the computer program 301 processing steps may proceed as usual. Lexicons 313 may be applied, grammars 314 may be run, and tagging models may be applied.

Example 2

In another example, the computer program 301 may be directed towards articles from China scientific journals such as the Chinese Journal of Computers and the ACTA AERONAUTICA ET ASTRONAUTICA SINICA. The articles from these journals may be categorized by the Chinese Library Classification (CLC) system (also known as the Classification for Chinese Libraries). The CLC may be the national library classification system scheme used in China. The CLC system may be hierarchical, starting off with 22 high-level categories such as Literature or Medicine which are then further subdivided into smaller and smaller subcategories. For example, in the CLC call number V221.2, the V relates to "Aviation and Aerospace", V2 may mean "Aviation", V22 may mean "Aircraft Structure and Design," and so on. With the Context Aware Translation System, document 303 classification may be as specific or general as needed. The documents 303 may have been categorized into various topic areas using a supervised machine learning system based on support vector machines. The Context Aware Translation System may use only the high-level categories.

Once these preprocessing steps are completed, a conditional random field (CRF)-based statistical named entity tagger may be applied. The entity tagger may be comprised of one or more different and complementary paradigms in order to accurately tag entities, such as: (i) lexical look-up 313, (ii) grammars 314, and/or (iii) machine-learning approach. In the first, lists of instances corresponding to various entity types, such as person name, organization name, chemical names, and biomedical names may be being culled through various sources. This includes widely available lexical resources, such as the Linguistic Data Consortium and as well as internet resources, such as DBPEDIA, WIKIPEDIA, GOOGLE News and/or other internet databases. The grammar 314 approach may involves using the grammar 314 toolkit that may be part of the computer program 301 in order to develop sets of specific rules in order to correctly identify and classify certain entity 307 types. This may be especially useful for handling entity 307 types that have a fairly consistent pattern (e.g. time and date expressions) as well as to handle exceptions which may not be handled by the one or more paradigms. Finally, we may use a machine learning module that may be trained on annotated Chinese corpora: the annotations may include low-level features as well as the entity 307 class. For this we may use the annotated corpora provided by the ACE program as well as corpora annotated in-house. The latter may include annotations of the Chinese scientific document corpora described above. This may enables the computer program 301 to learn specialized entity 307 types occurring in the scientific domain. The entity tagger may be based on a supervised learning model combining maximum entropy and Hidden Markov Models. The Context Aware Translation System may use the Viterbi algorithm to decode the best tag sequence for a given sentence. The Context Aware Translation System may be trained from the ACE 2004 and 2005 Chinese corpora (ACE, 2005) and the Context Aware Translation System may tag one or more of the following main categories such as people, geo-political entities (GPEs), organizations, locations, facilities, vehicles and weapons. The computer program's 301 entity 307 mention f-score may be currently at 82.6. In addition, the computer program 301 may include grammars 314 to tag numbers, dates, times, addresses and the like. After named entity tagging, the processor 305 uses heuristics to discover entity mentions that are aliases of each other. Most simply, if one or more mentions have the same text they may be considered to refer to the same entity 307. In other cases, if one or more mentions one may be a substring of the other, such as a surname and a full name that contains that surname may be linked together. In addition to these heuristics, the computer program 301 may have alias lexicons 313 derived from DBPEDIA, WIKIPEDIA, GOOGLE News and/or other internet databases that may be used to link entity mentions together.

Many lexicon 313 entries in the system may be extracted from the Chinese version of DBPEDIA, WIKIPEDIA, GOOGLE News and/or other internet databases. Most DBPEDIA, WIKIPEDIA, GOOGLE News and/or other internet databases articles include one or more DBPEDIA, WIKIPEDIA, GOOGLE News and/or other internet databases categories to which the article belongs. These categories may be used to identify article titles belonging to individual named entity categories. If a category includes certain keywords for an entity type, such as "cities" or "towns" in English, as in "Category: Cities in Germany" or chengshi ("city") in Chinese then the article title may be extracted as a possible city. Lists of category key words may have been developed for each of the ACE entity types. This method may get good recall and fairly high precision, 80-90% depending on the type but needs some manual filtering. Because DBPEDIA, WIKIPEDIA, GOOGLE News and/or other internet databases dumps are updated the lexicon 313 extraction program may be rerun to find all the new relevant entries that may have been added since the last update. This may happen periodically, such as once or twice a month and at the speed with which the Chinese DBPEDIA, WIKIPEDIA, GOOGLE News and/or other internet databases may be growing, doubling each of the past several years, this may be a fertile source for new lexical resources 313. Entries obtained this way number in the several tens of thousands.

Another feature of many DBPEDIA, WIKIPEDIA, GOOGLE News and/or other internet databases articles may be links to the title of the article in other languages. As the largest and best developed language version, English DBPEDIA, WIKIPEDIA, GOOGLE News and/or other internet databases includes the largest number of these cross-language links. When available, the English translation of a Chinese entity may be extracted using this method and included as part of the lexicon 313 entry.

While DBPEDIA, WIKIPEDIA, GOOGLE News and/or other internet databases may not include a separate listing of non-Chinese given and family names (names from non-Chinese languages), these may be extracted indirectly. Foreign names transliterated into Chinese often use a dot separator "." between the given and family name. By searching for Chinese article titles that may use this separator and then using the link to English version to get the English translation, not only can Chinese/English pairs of full names be obtained, but the individual given and family names may also be matched between languages and added to these appropriate lexicons. This may be useful not only in tagging person entities 307, but also translated them. Furthermore, lists of English names and their transliterated Chinese equivalents may be used in the system to learn mappings between Chinese characters and English characters.

Once the computer program 301 has identified a document's named entity 307 mentions, the computer program 301 may then attempt to provide translations for each. For many entities 307, especially relatively closed sets such as GPEs, the translation may already be included in one of the lexicons. For dates and numbers, specially constructed processors may be applied to generate their English equivalents.

Translation of person names depends on the type of name. Names may be broadly broken down into one or more categories: names of East Asian origin which have native Chinese character representations and names from outside this region which have been transliterated into Chinese using a standard set of Chinese characters. The first category includes names of Chinese people and in addition, names of people from the countries that have a long history of Chinese cultural influence, such as Japan, Korea and Vietnam (CJKV). Names from these countries may be represented natively in Chinese glyphs, even if this may not always be how it is now done (as for Vietnam). Names from Chinese-speaking regions, North and South Korea, and Vietnam may share a general structure. The name may start with one or more syllable surname drawn from several sets of possibilities. This may then be followed by a one or more syllable given name. Japanese names, though also generally written using Chinese-origin characters (kanji), may use a different, larger set of surnames. These names may also be transliterated into English depending on their pronunciation in their original languages.

Because name origin may be important to accurate transliteration, a person name translation system may identify the origin so that it may be transliterated appropriately. Fortunately, though these names may have a similar structure of a surname followed by a one or more character given name, the popularity of different surnames and given name characters varies greatly across regions. Contextual clues when a name may be first used often indicate its origin. The computer program 301 looks at the surrounding context of the name for these clue words to the person name origin. This classifier would also be useful to distinguish CJKV names from non-CJKV names in certain ambiguous instances.

Currently separate processing may be available for three types of Chinese names. For names of people from mainland China, the characters may be directly Romanized using a character to pinyin Romanization table. For names of people from Taiwan, characters are Romanized using the Wade-Giles Romanization system for Mandarin. Names of people from Hong Kong are Romanized according to their Cantonese pronunciations using the Jyutpin Romanization. Vietnamese names may be transliterated using the character readings from the Vietnamese field of the Unicode Unihan database. Korean Romanizations vary between North and South Korea, and have changed in South Korea over time. No single Romanization would work for all Korean names but currently the computer program 301 uses the South Korean 1984 McCune-Reischauer variant as the one with the broadest coverage.

Transliterating Japanese names found in Chinese text may present a unique challenge. A Japanese name typically has a one to three-character surname followed by a one or more— character given name. There are upwards of several hundred thousands of these surnames. The same surname or given name may have multiple possible readings which may not be automatically discovered but which would normally be indicated by some sort of annotation in Japanese texts that would not be present in Chinese texts. Japanese names are Romanized using the given and family name data from the ENAMDICT/JMNEDICT data file. This file may have a comprehensive list of Japanese family and given names. For names with multiple possible pronunciations, ENAMDICT/JMNEDICT sorts the Romanized pronunciations from most to least common. The computer program 301 may use the most common pronunciation for the family and given name to transliterate the full name.

The other classes of names found in Chinese texts may be ones that originated in non-CJKV languages and that may have been transliterated into Chinese based upon the pronunciation of the name. Transliteration from English to Chinese may be challenging because no consonant clusters may be allowed in Chinese dialects and Mandarin may not include the 'v' sound. Foreign names with consonant clusters may either have each consonant expanded to its own syllable or some of the consonants may be dropped. A name with sounds not supported in Chinese may find substitutes, like 'f' for 'v'. Finally, multiple spellings of a foreign name might all map to a single Chinese transliteration, for example, the name "Disney" has the following transliterated Chinese equivalents 803, 804, 805, 806, 807, the name "Hussein" has the following transliterated Chinese equivalents 808, 809, 810, and the "Ford", "Forde" and "Foord" map to the following Chinese transliterations 801, 802. Additionally, mainland China and Taiwan may pick different translations for the same non-Chinese name. And the transliteration may not have been done based on Mandarin, but other Chinese dialects. Chinese and foreign name translation may be a many-to-many mapping.

For non-CJKV names without a known translation, the computer program 301 attempts to recover the original name through back-transliteration. In back-transliteration, the name in Chinese may be compared against a large list of English names and a similarity score may be calculated for each. The equivalent pairs of Chinese character to English letters may first be learned with probabilities from a table of English names and their Chinese transliterations. A space may be added in between each Chinese character and between each letter. This parallel corpus may then be used as input to GIZA++ which may return alignments between the Chinese characters and the English letters. In the case of Chinese, the alignments may almost always be from one Chinese character to one or more letters (except for "x"). This data for all the name pairs may be used to calculate the probability of an English letter sequence given a particular Chinese character. When determining the similarity score or confidence score between a Chinese and English name, the computer program 301 may first use this mapping table to find potential character to letter alignments between the one or more names. The computer program 301 may then use a Viterbi algorithm to calculate the highest probability set of the alignments, returning this probability. This may be performed for each English name.

The computer program 301 may include a listing of over 280,000 English names derived from such sources as the U.S. census and a listing of all titles of articles in English WIKIPEDIA, GOOGLE News and/or other internet databases including a birth or a death date. When an unknown name is encountered in Chinese, its transliteration likelihood may be calculated against each of these names using the above pairs. The likeliest English name may then be returned and used. In tests of the back-transliteration with the computer program 301, the top name returned may have been the correct one 44% of the time, while the correct name was in the top 5 names returned 73% of the time and top 10 names 81% of the time.

When the type of name may have been ambiguous and unclear from context, possibly being either a Chinese name, a Japanese name or a transliterated foreign name, a Bayesian classifier may be applied based on the name's component characters. This may successfully disambiguate the name origin 98% of the time. The name may then be processed accordingly.

Translation for other entities types such as organizations, GPEs or locations may be supported by the computer program 301. These types of entity names generally include a mixture of words where some need to be translated semantically and others phonetically. If known, the computer program 301 uses a translation for each of the individual words in the organization name and may then string them together for the final translation. Translations of GPEs and locations may be accomplished in a similar fashion by translating known place words (such "river", "city", etc.) and then using back-transliteration against a comprehensive list of English place names to find the rest.

Example 3

In a further example, the processes illustrated in FIG. 2, may be implemented by the computer program 301 for improving the translation, transliteration or back-transliteration of Arabic entities to a Romanized language such as English as illustrated in FIG. 10. The computer program 301 received an input from electronic documents 303 containing Arabic entities 307. The computer program 301 classified the entities 307 based on the native orthographic origin of each entity. In some alternatives, the computer program 301 may apply a Bayesian or Nairve-bayes classifier using n-grams of the characters or letters in the entities 307.

The computer program 301 may contain a module that can provide transliteration for an input from electronic documents 303 containing Arabic entities 307 into another Romanized target language, using probabilities of how likely one or more graphemes in the source language will map to one or more graphemes in the target language and also a list of entities 307 with their associated frequency in the target language. That is, the computer program 301 may uses a combination of the letter to letter probabilities and how common the target entity 307 is in the language. The letter to letter probabilities may be learned by starting with a parallel name corpus with the same entity 307 in both languages. The letters/characters in each entity 307 are separated by a space and alignments between the letters/characters in the entity 307 in each language are generated using GIZA++. These alignments are then read and used to calculate the final probabilities.

In accordance with another embodiment of the Context Aware Translation System, as illustrated in FIGS. 1 and 2, and described above, the results of step 102 may optionally be output to one or more formats compatible with machine translation systems as illustrated in step 103. Step 103 may optionally be described in further detail in step 207. In step 207, the computer program 301 may output the Entity Profile 302, x back transliteration, transliteration or translation and confidence score in to multiple output 601 formats compatible with machine translation systems. In some alternatives, x may be at least three and less than ten. The machine translation systems may use an algorithm such as a probability algorithm to select either the transliteration/translation received from the computer program 301 or the machine translation systems' own translation.

Example 4

This example focused on using the training data from the ACE 2007 Entity Translation task. From this corpus, 197 total documents, 39 (20%) were selected for use in this experiment. The named entity mentions were extracted from the English version of these documents 303 and this served as the key for the experiment. In addition to this a set of some common alternative translations were constructed for some entities, such as America, American, US, U.S., USA, and United States of America. If a translation was found in the same set of alternatives as the key translation, it was deemed correct. The source Chinese documents was run through Content Aware Translation System, entity 307 translations extracted and duplicates collapsed, and then these results compared against the keys described above in FIG. 4. FIG. 4 illustrates the results from using various embodiments of the Content Aware Translation System for translating a Person entity 307 type. When translations only came from the lexicon 313, which included several tens of thousand well-known full names, recall was low and the f-score only 19.35. Using back-transliteration to recover names increases recall slightly but may introduce enough noise to significantly lower precision. Processing for just CJKV names gave large gains for both precision and recall. Finally using all these techniques together gave the highest recall but lowered the final f-score due to the low precision from the back-transliteration process. This low precision may possibly be due to the fact that only the top-ranked name returned by back transliteration was used. Inspection of the results of back-transliteration showed that often even if the top name returned was not correct, it was often similar to or a close variant of the desired name. Because the computer program 301 may be run in environments without available access to the Internet, this may not likely be a viable option. Alternatively, the computer program 205 may use a language model built from a large English language corpus as an additional source of information to choose the best alternative. Other than for Person, translation for other entities 307 may be mostly done through the lexicons 313. One plan for organizations may be to build a special organization-only Moses-type statistical machine translation system. The computer program 301 would identify the organizations and may pass them to the translation decoder, and use these results. By limiting the translation to other than for Person, translation for other entities 307 can be mostly done through the lexicons 313. By limiting the translation model to just organizations, one can improve how a general purpose model would work for them. The high scores for GPEs reflect that they may be a relatively closed set and so may be better captured through comprehensive lexicons. Finally the low scores of the facilities and locations may be likely partially due to the small number of these found in the evaluation corpus.

Example 5

This example focuses on illustrating the effect of performing NER prior to machine translation. A Chinese snippet of text 901 is followed by various types of translation based on different strategies dealing with the name recognition, transliteration and translation 902, 903, 904, 905 and 906. In the second translation 903 obtained by querying a machine translation system, GOOGLE misses the first instance of the General Ramm's name and doesn't seem to include anything. In the second instance it gets mistranslated as Rumsfeld. In the third translation 904 obtained by replacing the Chinese name with the actual English name, the two instances of the Chinese name were replaced with the actual translation for Ramms. The above may be the result. The translation of the first occurrence may be slightly better, while the second may be worse, leaving out the verb "said". It appears that in this case the word Ramms may be much less frequent than Rumsfeld and so the language model may have less to work with in constructing a good translation. In the fourth translation, 905, obtained by replacing the Chinese name with the pinyin transliteration, if the name was identified but no translation was available: just the transliteration of the word was used. The translation quality decreased. Again, the word would be very rare in the language, if it was seen at all. Finally, in the fifth translation 906, the objective was to determine what would happen if the Chinese name was replaced with a more common name, especially a well known general. If a language model could make use of a class-based model with named entities 307, the output would be the fifth translation 906.

In another embodiment, the Context Aware Translation System may provide a robust and scalable multilingual faceted search application that combines computer program 301 extraction and an enterprise search server according to embodiments of the Context Aware Translation System described above. In some alternatives, the Context Aware Translation System may provide a powerful web-based search engine that allows drill down by entity mentions, event and relationship categories 1102, and multilingual name and event translations, in addition to keyword searching filed 1108 of documents 1101 as illustrated in FIGS. 11 and 12.

Figure 11:
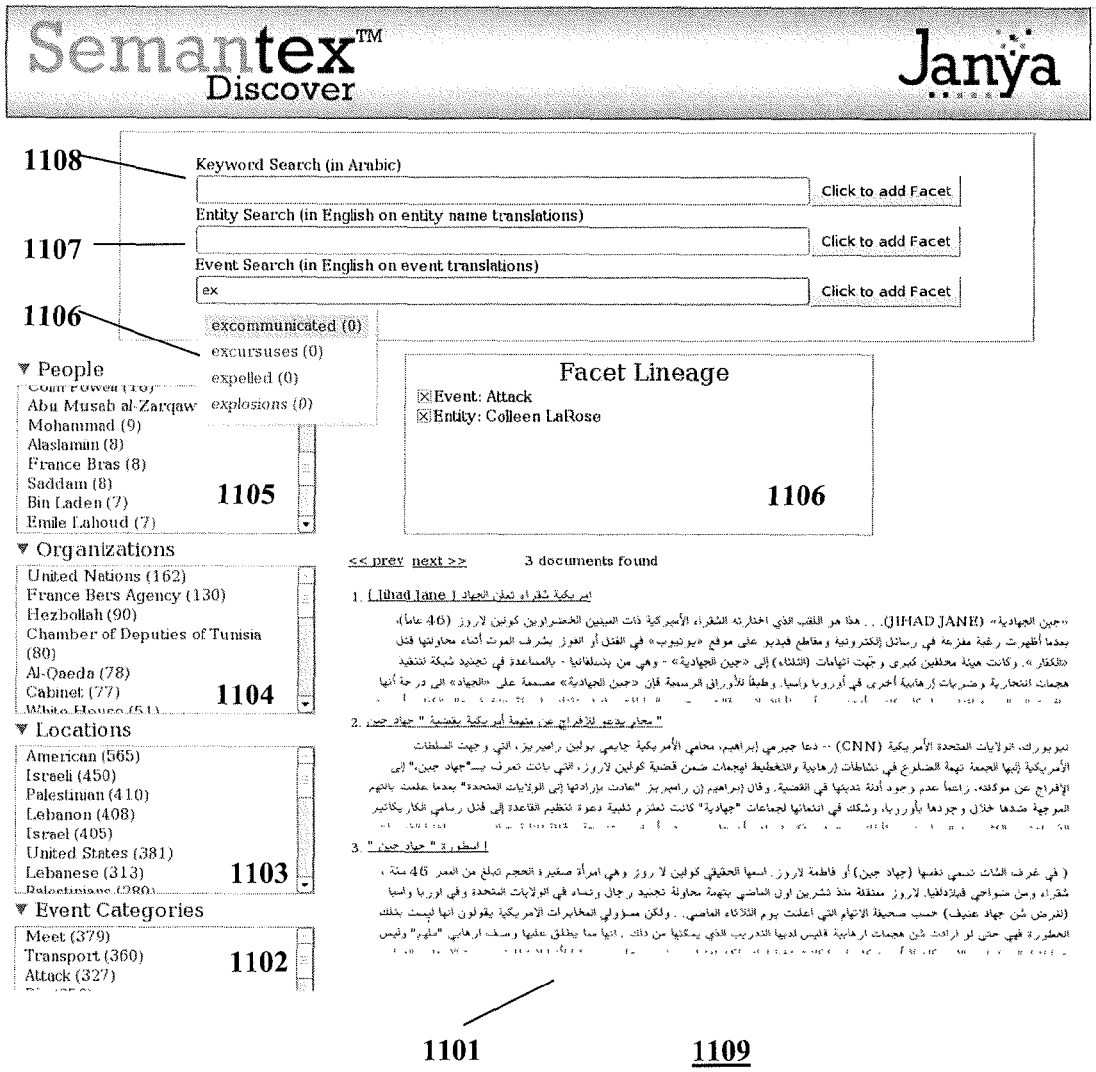
FIG. 11 is an illustrative example of a Romanized query interface for searching a triaging a non-Romanized document corpus according to one embodiment of a Context Aware Translation System.

FIG. 11 shows one embodiment of an interface for an embodiment of a Context Aware Translation System that allows for the searching of a document 1101 using a different language that the language of the document. In some alternatives, the computer program 301 may use an interface 1109 that allows drill down by pre-populated entity mentions 1103, 1104, 1005, event and relationship categories 1102, and multilingual name and event translations, in addition to keyword searching field 1108 in the same language as the corpus, Entity Searching Field 1106 or Event Searching Field 1107 in a Romanized language according to various embodiments of the Context Aware Translation System to search and triage using Romanized translations of entities 307. The pre-populated section allows the user to quickly select and see an overview of the entity profiles determined in document 1101, which is in a first language (foreign to the user). The entity profile identifiers displayed are in a second language (which is the language selected by the user and generally native to the user). In some alternatives, the computer program 301 may filter by broad event category as well as search on Romanized language translations of specific event mentions.

The interface includes a keyword searching field 1108. Keyword searching field 1108 is configured to receive a search term from a user for a search term in a first language selected by the user and search the document 1101 presented in a second language different from the first language. The search term or keyword received is by an embodiment of computer program 301 as described above and the document 1101 is searched and processed accordingly, as described above.

The interface includes an entity searching field 1106. Entity search entry field 1106 is configured to receive an input from a user for a search term in a first language selected by the user and search the document 1101 presented in a second language different from the first language. In this case the search term is not treated as a typical keyword search. Instead, by entering the search term in entity search entry field 1106 the user is pre-designating that the search term belongs to an entity as described above. The search term is received by an embodiment of computer program 301 as described above and the document is searched and processed accordingly, as described above. Since the search term is already known to be an entity, the computer program 301 identifies potential entities in the document 1101 and compares the search term according to the methods described above primarily to entities found in document 1101.

The interface includes an event searching field 1107. Event searching field 1107 is configured to receive an input from a user for a search term in a first language selected by the user and search the document 1101 presented in a second language different from the first language. In this case the search term is not treated as a typical keyword search. Instead, by entering the search term in event searching field 1107 the user is pre-designating that the search term belongs to an event as described above. In some embodiments, events are a subset of entities. The search term is received by an embodiment of computer program 301 as described above and the document 1101 is searched and processed accordingly, as described above. Since the search term is already known to be an event, the computer program 301 identifies potential entities in the document 1101 and compares the search term according to the methods described above primarily to events found in document 1101.

In some alternatives, the computer program 301 may tag entity mentions with their entity 307 type and translation, event mentions with their event category 1102 and translation, as well as relationships 1106 in each document. The computer program 301 tagged documents may in turn be indexed by one or more search servers that indexes not only keywords, but also facets such as People 1105 and Event Categories 1102.

The computer program 301 provides event categorization 1102 using a facet linkage 1106 that recognizes, tags and translates a variety of verb and non-verb possibilities for events of the same type (e.g., attack). This is especially useful for triage on multilingual document collections. The interface described in FIG. 11 and the above text is only one possible embodiment for the interface and the parts and pieces may be omitted, combined, and the appearance may be changed.

In some alternatives, the computer program 301 provides an interface, such as a document viewer 1201 to highlight tagged entities 307 and events in a non-Romanized language, along with translations, transliterations or back-transliterations provided by the computer program 301.

The flowcharts, illustrations, and block diagrams of FIGS. 1 through 12 illustrate the architecture, functionality, and operation of possible implementations of systems and methods according to various embodiments of the Content Aware Translation System. In this regard, each block in the flow charts or block diagrams may represent a module, electronic component, segment, or portion of code, which comprises one or more executable instructions for implementing the specified function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments and, although specific terms are employed, they are used in a generic and descriptive sense only and not for purposes of limitation, the scope being set forth in the following claims.

Although the foregoing description is directed to the preferred embodiments of the Context Aware Translation System, it is noted that other variations and modifications will be apparent to those skilled in the art, and may be made without departing from the spirit or scope of the Context Aware Translation System. Moreover, features described in connection with one embodiment of the Context Aware Translation System may be used in conjunction with other embodiments, even if not explicitly stated above.

The invention claimed is:

1. A system for transforming content of an electronic document from a non-Romanized native language to a Romanized language, the system comprising one or more processors and memory to store program code that, when executed by the one or more processors, causes the one or more processors to:
   identify within the native language document one or more references, in the native language, to entities having Romanized language names;
   generate a preprocessed version of the native language document in which the identified references to entities having Romanized language names are replaced by the Romanized language names and corresponding tags that specify the Romanized language names as named entities; and
   translate the preprocessed version of the native language document into a Romanized-language output document, maintaining the Romanized language names in the output document and applying the Romanized language names and corresponding tags as context for disambiguating remaining native language expressions in the preprocessed version of the native language document.

2. The system of claim 1, wherein the program code that, when executed by the one or more processors, causes the one or more processors to identify the one or more references to entities having Romanized language names comprises program code that, when executed, causes the one or more processors to transliterate the native language document into a Romanized language output.

3. The system of claim 2, wherein the program code that, when executed by the one or more processors, causes the one or more processors to identify the one or more references to entities having Romanized language names comprises program code that, when executed, causes the one or more processors to compare contents of the Romanized language output with Romanized language names within one or more databases.

4. The system of claim 3, wherein the one or more databases are selected from a group consisting of websites, internet databases, dictionaries, lexicons and native language classification databases and combinations thereof.

5. The system of claim 1, wherein the program code that, when executed by the one or more processors, causes the one or more processors to identify the one or more references to entities having Romanized language names comprises program code that, when executed, causes the one or more processors to split contents of the native language document into segments.

6. The system of claim 1, wherein the native language of the native language document falls within a group consisting of Arabic, Armenian, Belarusian, Bengali, Bulgarian, Chinese, Croatian, Czech, Devanagari, Divehi, Farsi, Georgian, Greek, Gujarati, Hebrew, Hindi, Japanese, Kannada, Kazakh, Korean, Kyrgyz, Latvian, Lithuanian, Macedonian, Malayalam, Marathi, Mongolian, Pashtun, Punjabi, Romanian, Russian, Serbian, Syriac, Tamil, Telugu, That, Turkish, Ukrainian, Urdu, Uzbek, Vietnamese, other non-Romanized languages and combinations thereof.

7. The system of claim 1, wherein the program code that, when executed by the one or more processors, causes the one or more processors to identify the one or more references to entities having Romanized language names comprises program code that, when executed, causes the one or more processors to generate a confidence score for each of the one or more references based on at least one of a probability that letters in the native language document are equivalent to letters in the Romanized language or a probability that a transliterated string within the native language document corresponds to a named entity in the Romanized language.

8. The system of claim 1 wherein the tags that specify the Romanized language names as named entities include information indicating an entity type.

9. The system of claim 8 wherein the information indicating the entity type specifies, as the entity type, at least one of a person, place, organization, product name, event, or meme.

10. A method, executed within one or more computer processors, of transforming content of an electronic document from a non-Romanized native language to a Romanized language the method comprising:
   identifying within the native language document one or more references, in the native language, to entities having Romanized language names;
   generating a preprocessed version of the native language document in which the identified references to entities having Romanized language names are replaced by the Romanized language names and corresponding tags that specify the Romanized language names as named entities; and
   translating the preprocessed version of the native language document into Romanized-language output document, maintaining the Romanized language names in the output document and applying the Romanized language names and corresponding tags as context for disambiguating remaining native language expressions in the preprocessed version of the native language document.

11. The method of claim 10, wherein identifying the one or more references to entities having Romanized language names comprises transliterating the native language document into a Romanized language output.

12. The method of claim 11, wherein identifying the one or more references to entities having Romanized language names further comprises comparing contents of the Romanized language output with Romanized language names within one or more databases.

13. The method of claim 12, wherein the one or more databases comprise external databases selected from a group consisting of websites, internet databases, dictionaries, lexicons and native language classification databases and combinations thereof.

14. The method of claim 10, wherein identifying one or more references to entities having Romanized language names within the native language document comprises splitting contents of the native language document into segments.

15. The method of claim 10, wherein identifying one or more references to entities having Romanized language names within the native language document comprises generating a confidence score for each of the one or more references based on at least one of a probability that letters in the native language document are equivalent to letters in the Romanized language or probability that a transliterated string within the native language document corresponds to a named entity in the Romanized language.

16. The method of claim 10, wherein the native language of the native language document falls within a group consisting of Arabic, Armenian, Belarusian, Bengali, Bulgarian, Chinese, Croatian, Czech, Devanagari, Divehi, Farsi, Georgian, Greek, Gujarati, Hebrew, Hindi, Japanese, Kannada, Kazakh, Korean, Kyrgyz, Latvian, Lithuanian, Macedonian, Malayalam, Marathi, Mongolian, Pashtun, Punjabi, Romanian, Russian, Serbian, Syriac, Tamil, Telugu, That, Turkish, Ukrainian, Urdu, Uzbek, Vietnamese, other non-Romanized languages and combinations thereof.

17. The method of claim 10 wherein the tags that specify the Romanized language names as named entities include information indicating an entity type.

18. The method of claim 17 wherein the information indicating the entity type specifies, as the entity type, at least one of a person, place, organization, product name, event, or meme.

19. A non-transitory computer-readable medium having one or more sequences of instructions embodied therein which, when executed by one or more processors, cause the one or more processors to:
   identify within the native language document one or more references, in the native language, to entities having Romanized language names;
   generate a preprocessed version of the native language document in which the identified references to entities having Romanized language names are replaced by the Romanized language names and corresponding tags that specify the Romanized language names as named entities; and
   translate the preprocessed version of the native language document into Romanized-language output document, maintaining the Romanized language names in the output document and applying the Romanized language names and corresponding tags as context for disambiguating remaining native language expressions in the preprocessed version of the native language document.

* * * * *